United States Patent [19]

Agatonovic

[11] Patent Number: 5,564,874
[45] Date of Patent: Oct. 15, 1996

[54] FASTENING ELEMENT IN THE FORM OF A FIBER-REINFORCED CERAMIC SCREW AND/OR NUT FOR CERAMIC COMPONENTS

[75] Inventor: Petar Agatonovic, Sigmertshausen, Germany

[73] Assignee: MAN Technologie Aktiengesellschaft, München, Germany

[21] Appl. No.: 231,112

[22] Filed: Apr. 22, 1994

[30] Foreign Application Priority Data

Oct. 29, 1993 [DE] Germany ............... 43 37 043.8

[51] Int. Cl.⁶ ............................................. F16B 35/04
[52] U.S. Cl. ................ 411/424; 411/417; 411/428; 411/908
[58] Field of Search ..................... 411/411, 908, 411/909, 417, 418, 424, 427, 436

[56] References Cited

U.S. PATENT DOCUMENTS

| | | | |
|---|---|---|---|
| 2,820,972 | 1/1958 | Ptak | 411/424 |
| 2,949,054 | 8/1960 | White | 411/418 |
| 3,127,625 | 4/1964 | Ruminsky | 411/424 |
| 3,495,494 | 2/1970 | Scott | 411/908 |
| 4,623,290 | 11/1986 | Kikuzawa | 411/417 |
| 4,909,690 | 3/1990 | Gapp | 411/424 |
| 5,127,783 | 7/1992 | Moghe | 411/424 |

FOREIGN PATENT DOCUMENTS

| | | | |
|---|---|---|---|
| 0374088 | 6/1990 | European Pat. Off. | |
| 2920357 | 11/1980 | Germany. | |
| 3318767 | 12/1983 | Germany. | |
| 3241963 | 4/1984 | Germany. | |
| 3606179 | 8/1987 | Germany. | |
| 531936 | 10/1978 | U.S.S.R. | 411/418 |

*Primary Examiner*—Flemming Saether
*Attorney, Agent, or Firm*—Robert W. Becker & Associates

[57] ABSTRACT

A fastening or connecting device for fiber-reinforced ceramics to be used in high temperature ranges is in the form of a screw that is manufactured of a ceramic material in the shape of a plate having fiber layers with fibers oriented parallel to the surface of the plate. The plate thickness is less than 90% of the core diameter of the thread so that upon cutting a thread a discontinuous thread results. The bore of a complementary nut is provided with a continuous inner thread that cuts through the fiber layers at a right angle.

5 Claims, 1 Drawing Sheet

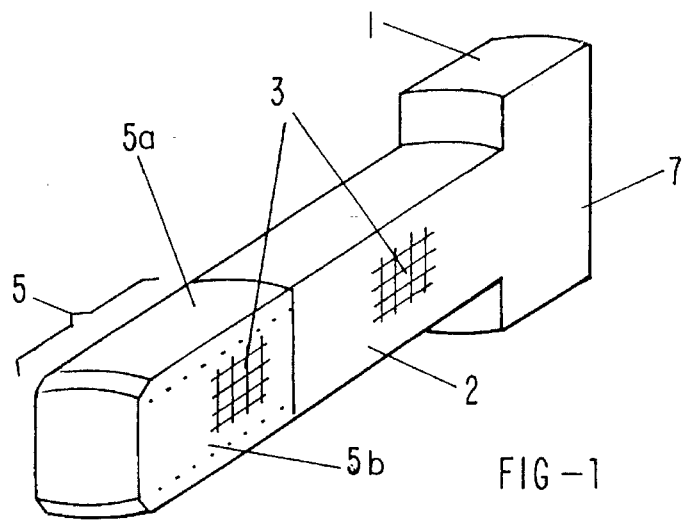
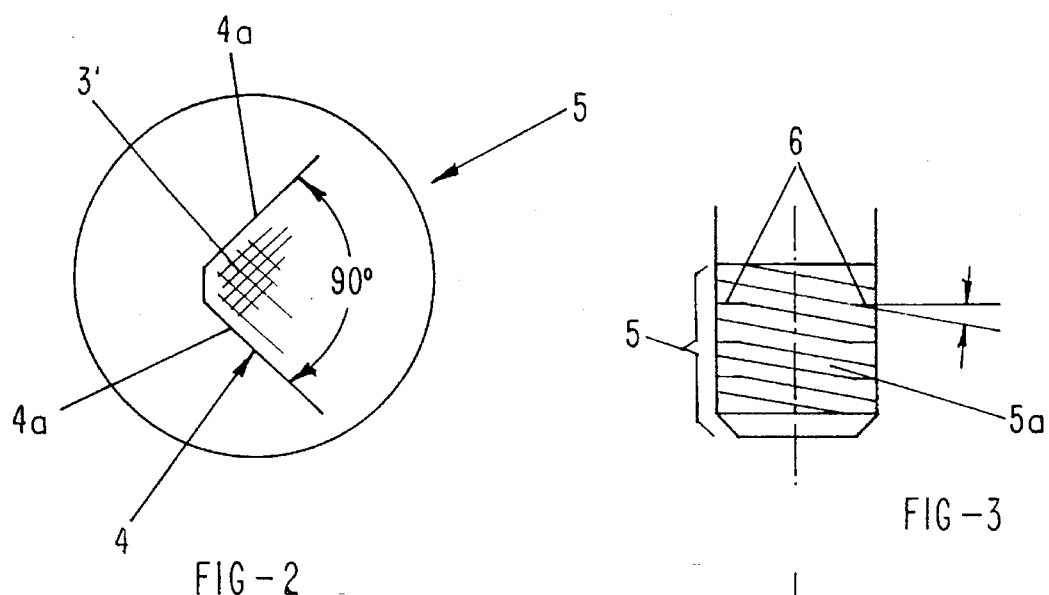
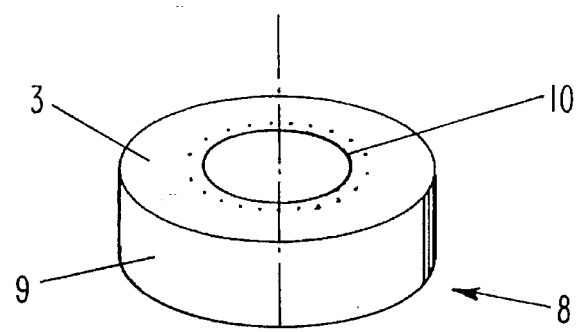
FIG-1
FIG-2
FIG-3
FIG-4

FASTENING ELEMENT IN THE FORM OF A FIBER-REINFORCED CERAMIC SCREW AND/OR NUT FOR CERAMIC COMPONENTS

BACKGROUND OF THE INVENTION

The present invention relates to a fastening or connecting element for ceramic components.

Ceramic materials and especially fiber-reinforced ceramic materials belong to the group of most important materials for technical developments in space applications due to their high temperature resistance combined with a very low specific weight.

Presently, a plurality of structural components for thermal protection, rocket propulsion systems etc. are produced from these materials. Larger components are produced for reasons of technical simplicity and economic considerations from individual parts according to the principle of separation and combination. For connecting such components fastening elements are necessary. Their general importance becomes obvious when one considers that they are, according to their application, the most important and most ubiquitous structural element overall. Threaded connections are traditionally of a great importance in machine construction, aerospace construction, and in many other technical fields.

The methods for subsequently connecting parts must be simple and economical, but also provide elements that are structurally compatible with the parts to be connected so that their load capacity and their limits with respect to applications, for example, with respect to temperature ranges, are not impeded. However, this is not possible with fastening elements of conventional materials, for example, metallic materials. Even though metallic fastening elements have in general advantageous properties, they are essentially not suitable for connecting ceramic components. Their substantially greater heat expansion coefficient, their tendency to flow, and the relatively low load capacity at temperatures that are still relatively low with respect to the temperature range of ceramic materials as well as their oxidation sensitivity result in the fact that metallic fastening elements can be used at high temperatures only to a small extent. Already at temperatures of use of up to 1600° C., which are typical for fiber-reinforced ceramic materials, metallic screws can no longer be used.

It is therefore an object of the present invention to provide a fastening element of the aforementioned kind for ceramic components that are exposed to high temperatures.

BRIEF DESCRIPTION OF THE DRAWINGS

This object, and other objects and advantages of the present invention, will appear more clearly from the following specification in conjunction with the accompanying drawings, in which:

FIG. 1 shows a perspective view of an inventive fastening element in the form of a screw;

FIG. 2 shows a detail of the thread ribs;

FIG. 3 shows a side view of the threaded portion of the screw;

FIG. 4 shows a nut for cooperation with the inventive screw.

SUMMARY OF THE INVENTION

The fastening device for connecting ceramic components according to the present invention is comprised of a screw made of ceramic material.

With the inventive fastening device, a connection of structures made of ceramic materials is possible in which comparable or identical materials are used so that the aforementioned disadvantages no longer exist.

Preferably, the screw has a discontinuous thread. Preferably, the thread is comprised of at least one thread rib portion and at least one intermittent threadless portion, wherein the screw has at least one circumferential portion provided with the intermittent threadless portion.

Advantageously, the thread rib portion has ribs with a cross-section having flanks arranged at an angle of 90°. Advantageously, the ribs have, in the direction of threading, a flattened inlet and a flattened outlet. The screw has a head designed to maintain the screw in position after threading. Preferably, the head is a four-cornered flat head.

According to another embodiment of the present invention, the screw is preferably comprised of fiber-reinforced ceramic material. It has been demonstrated that by providing a screw made of fiber-reinforced ceramic material the high sensitivity with respect to tension concentrations and low adaptability of monolithic ceramics due to the lack of possibilities for inelastic deformations has been considerably reduced. Since high tension concentrations cannot be avoided with fastening elements (for example, in the area of the thread, the head, and the force and friction locking), the present invention provides a suitable solution.

Advantageously, the screw comprises first fiber layers having a first set of fibers extending parallel to a longitudinal axis of the screw and a second set of fibers extending perpendicular to the longitudinal axis, and wherein the screw has a shaft that has a substantially square cross-section. Advantageously, the thread rib portion is positioned on narrow sides of the substantially square shaft.

In a preferred embodiment of the present invention, second fiber layers have fibers oriented at ±45° relative to the longitudinal axis, wherein the fibers extend parallel to flanks of the thread ribs.

Advantageously, the arrangement of the first set of fibers extending in the longitudinal direction of the shaft is selected to adjust the prestress capacity of the screw according to a desired application, such as an axial connection or a shearing connection.

Expediently, the fastening device further comprises a nut comprised of ceramic material with fiber reinforcement, the nut having a continuous inner thread cut through the fiber reinforcement at a right angle.

The placement of fibers in a suitable position for the fastening device has been difficult in previous designs. The stability of the thread after cutting suffers from the fibers at the edge being cut very short so that the thread does not lock properly. In order to be able to maintain the required prestress of the fastening device, it is suggested to arrange the plurality of one type of fiber layers of the reinforcement in this direction.

The screw is preferably cut from a plate of fiber-reinforced ceramic material with fiber layers (laminates) parallel to the surface of the plate. The thickness of the plate is in general less than 90% than the core diameter of the thread. The thread of the screw is preferably discontinuous so that the parts of the thread ribs that are in danger of edge breakage are avoided from the beginning. This ensures the required durability and form stability.

The thread ribs are designed to have a cross-section of 90°. This increases the load capacity as well as the bending resistance of the ribs which properties are advantageous with respect to the prevention of fissures within the ceramic material and also result in a reduction of the circumferential length of the thread. At the same time, the plate can be manufactured by providing a combination of fiber layers of a 0°/90° arrangement and a −45°/+45° arrangement so that the 45° fibers are always parallel to the surface of the rib flanks. This novel solution additionally reinforces the thread.

By properly selecting the portion of fibers in the direction of the longitudinal axis of the shaft of the screw, prestress capacities of the screw can be adjusted which can thus be used for axial as well as shearing connections. Since the thread is discontinuous, the sharp edges at each inlet and outlet must be flattened.

Another advantage of the present invention is that the rib cross-section with flanks at an angle of 90° results in a greater slope and a reduced number of revolutions during mounting as compared to a conventional thread so that thereby the risk of damaging the screw during mounting is reduced. If desired, the connection can be secured against loosening by gluing.

The contour of the head of the screw is four-cornered, for example, a hammer head with the initial dimensions of the plate. Accordingly, the screw can be held in position or can be secured against rotation.

If necessary, the fastening device of the present invention may include a nut.

The nut as the complementary part of the fastening device, i.e., of the thread pair, has a continuous inner thread because, in this case, the residual length of the fibers in the layer cut by boring is not reduced to 0, as in case of the screw. The outer diameter of the nut must be greater than the outer diameter of a conventional nut in order to compensate for the higher radial load resulting from the 90° profile. Since in a single plane the thread only provides support on two (threaded) sides and allows for play between nut and screw at the threadless sides perpendicular to the threaded sides, the nut can adapt to the load exerted onto the thread by elliptical deformations. The size of the outer diameter therefore must be calculated and optimized correspondingly.

DESCRIPTION OF PREFERRED EMBODIMENTS

The present invention will now be described in detail with the aid of several specific embodiments utilizing FIGS. 1 through 4.

The screw 1, 2 of FIG. 1 is comprised of fiber-reinforced ceramic material and has a head 1 and a shaft 2. The screw 1, 2 is manufactured from a plate with fiber layers 3, 3' parallel to the surface. The plate thickness is less than 90% of the core diameter of the thread 5 so that upon cutting the thread a thread contour results that at two sides perpendicular to the planar surfaces 7 is discontinuous, i.e., the thread 5 has two thread rib portions 5a and two intermittent threadless portions 5b. The thread ribs 4 have a cross-section with flanks at an angle of 90° (FIG. 2) and are provided with flattened inlets and outlets 6 (schematically shown in FIG. 3). The contour of the screw head 1 is four-cornered (rectangular).

The plate made of fiber-reinforcement ceramic material is manufactured by combining fiber layers with a 0°/90° arrangement (3) and a −45°/+45° arrangement (3'). Accordingly, via the 0° fibers of the fiber layers of the 0°/90° arrangement 3 the prestress capacity in the direction of the shaft 2 can be adjusted and the +45° fibers of the fiber layers 3' are always parallel to the flanks of the thread ribs 4.

The complementary nut 8 according to FIG. 4 is also made of fiber-reinforced ceramic material 9 and has a continuous inner thread 10 that cuts through the fiber layers 3 of the ceramic material 9 at a right angle.

The present invention is, of course, in no way restricted to the specific disclosure of the specification and drawings, but also encompasses any modifications within the scope of the appended claims.

What I claim is:

1. said fastening device comprising:

a screw comprised of ceramic material;

said screw comprising a shaft with a thread;

said shaft having two parallel planar surfaces;

said thread comprising two thread rib portions positioned between said two parallel planar surfaces;

said two parallel planar surfaces spaced from one another at a distance that is less than 90% of a core diameter of said thread;

said thread rib portions comprising thread ribs, said thread ribs having two flanks positioned at an angle of 90° relative to one another;

said screw comprising reinforcement-fibers in the form of fiber layers embedded in said ceramic material, said fiber layers being in the form of laminates;

said fiber layers arranged parallel to said parallel planar surfaces and parallel to a longitudinal axis of said screw;

said fiber layers comprising a first set of fiber layers of a ±45° arrangement of said reinforcement fibers relative to the longitudinal axis of said screw wherein said reinforcement fibers positioned at +45° are positioned parallel to one of said flanks and said reinforcement fibers positioned at −45° are positioned parallel to other of said flanks.

2. A fastening device according to claim 1, wherein said thread ribs have, in a direction of threading, a flattened inlet and a flattened outlet.

3. A fastening device according to claim 1, wherein said screw comprises a head in the form of a four-cornered flat head.

4. A fastening device according to claim 11 further comprising a nut of ceramic material for threading onto said screw, said nut having embedded therein reinforcement fibers in the form of fiber layers, wherein said nut has a continuous inner thread cut through said fiber layers substantially at a right angle and wherein said fiber layers are in the form of laminates.

5. A fastening device according to claim 4, wherein said fiber layers of said nut comprise a first set of a ±45° arrangement of said reinforcement fibers relative to the longitudinal axis of said screw and a second set of a 0°/90° arrangement of said reinforcement fibers relative to the longitudinal axis of said screw.

\* \* \* \* \*